(12) United States Patent
Thompson et al.

(10) Patent No.: US 7,921,607 B2
(45) Date of Patent: Apr. 12, 2011

(54) APPARATUS FOR MOUNTING A SOLAR PANEL OR OTHER ARTICLE TO A ROOF OR OTHER STRUCTURE

(75) Inventors: Daniel S. Thompson, San Rafael, CA (US); Monty Mullins, Rohnert Park, CA (US); Richard I. Proctor, San Rafael, CA (US); Zhan Zhang, San Rafael, CA (US)

(73) Assignee: Thompson Technology Industries, Inc., Novato, CA (US)

( * ) Notice: Subject to any disclaimer, the term of this patent is extended or adjusted under 35 U.S.C. 154(b) by 7 days.

(21) Appl. No.: 12/579,351

(22) Filed: Oct. 14, 2009

(65) Prior Publication Data

US 2010/0088996 A1    Apr. 15, 2010

Related U.S. Application Data

(63) Continuation-in-part of application No. 11/326,271, filed on Jan. 4, 2006, now abandoned.

(60) Provisional application No. 60/641,198, filed on Jan. 4, 2005.

(51) Int. Cl.
    *E04D 1/36*    (2006.01)
(52) U.S. Cl. ...... 52/60; 52/58; 52/27; 52/698; 52/173.3; 248/237
(58) Field of Classification Search .............. 52/27, 698, 52/58, 173.3, 410, 60, 219; 343/890, 891, 343/892, 878, 880, 882; 248/220.21, 224.8, 248/222.41, 223.41, 500, 237, 231.71, 226.11, 248/205.1, 200; 136/244; 126/62
    See application file for complete search history.

(56) References Cited

U.S. PATENT DOCUMENTS

| 917,167 | A | * | 4/1909 | Shaw | 285/43 |
| 1,691,478 | A | * | 11/1928 | Henderson | 248/237 |
| 1,864,457 | A | * | 6/1932 | Nelson | 248/237 |
| 1,883,508 | A | * | 10/1932 | Bonday | 248/536 |
| 4,442,643 | A | * | 4/1984 | Stadheim | 52/219 |
| 5,010,700 | A | * | 4/1991 | Blair | 52/199 |
| 5,226,263 | A | * | 7/1993 | Merrin et al. | 52/58 |
| 5,328,212 | A | * | 7/1994 | Kosik et al. | 285/42 |
| 5,456,433 | A | * | 10/1995 | Burns et al. | 248/148 |
| 5,536,048 | A | * | 7/1996 | Orr | 285/42 |
| 5,603,187 | A | * | 2/1997 | Merrin et al. | 52/58 |
| 5,820,092 | A | * | 10/1998 | Thaler | 248/237 |

(Continued)

*Primary Examiner* — Robert J Canfield
*Assistant Examiner* — Babajide Demuren
(74) *Attorney, Agent, or Firm* — Craig M. Stainbrook; Stainbrook & Stainbrook, LLP

(57) ABSTRACT

An apparatus for mounting an article to a roof includes a base plate, threaded stud, lag bolts, spacer, and flashing. The base plate includes bolt holes to accommodate the lag bolts to secure the base plate to the roof. The threaded stud is secured to and extends vertically from the base plate. The spacer is inserted over the stud so that the stud passes through an aperture in the spacer, and is secured by a nut. The spacer acts as a lift for mounting an article up off the roof, thereby permitting drainage. The spacer includes a recess to accommodate the head of a lag bolt. The wrap-around flashing is captured between the base plate and spacer, creating a water free environment underneath the assembled unit. The flashing slides up underneath the roofing shingles to prevent water from penetrating the structure, and includes a lip to accommodate the base plate, and a detent to accommodate the bolt heads beneath it.

5 Claims, 2 Drawing Sheets

U.S. PATENT DOCUMENTS

| | | | |
|---|---|---|---|
| 5,862,637 A * | 1/1999 | Bruce | 52/147 |
| 5,886,673 A * | 3/1999 | Thomas | 343/882 |
| 6,360,491 B1 * | 3/2002 | Ullman | 52/22 |
| 6,584,737 B1 * | 7/2003 | Bradley, Jr. | 52/173.3 |
| 6,591,561 B1 * | 7/2003 | Evensen | 52/199 |
| 6,601,351 B1 * | 8/2003 | Zerfoss | 52/198 |
| 6,691,469 B2 * | 2/2004 | Miller | 52/60 |
| 6,892,499 B1 * | 5/2005 | Mayle | 52/219 |
| 7,435,134 B2 * | 10/2008 | Lenox | 439/567 |
| 2004/0255523 A1 * | 12/2004 | Bibaud et al. | 52/58 |

\* cited by examiner

APPARATUS FOR MOUNTING A SOLAR PANEL OR OTHER ARTICLE TO A ROOF OR OTHER STRUCTURE

CROSS REFERENCE TO RELATED APPLICATIONS

The present application is a continuation-in-part patent application of U.S. patent application Ser. No. 11/326,271, filed Jan. 4, 2006, which application claims the benefit of the filing date of U.S. Provisional Patent Application Ser. No. 60/641,198, filed Jan. 4, 2005.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates generally to construction materials and mounting hardware, and more particularly to an improved apparatus for mounting a solar panel or other article to a roof or other structure.

BACKGROUND INFORMATION AND DISCUSSION OF RELATED ART

Installing a solar panel or other article to the roof of a building can be problematic. For example, simply bolting the article to the building's roof trusses may create an entry point for precipitation. In addition, securing the article too close to the roof may obstruct proper drainage and create a water dam, thereby increasing the likelihood of leakage and premature roof deterioration.

The foregoing discussion reflects the current state of the art of which the present inventors are aware. Reference to, and discussion of, this information is intended to aid in discharging Applicant's acknowledged duty of candor in disclosing information that may be relevant to the examination of claims to the present invention. However, it is respectfully submitted that none of the known prior art discloses, teaches, suggests, shows, or otherwise renders obvious, either singly or when considered in combination, the invention described and claimed herein.

SUMMARY OF THE INVENTION

The apparatus for mounting a solar panel or other article to a roof or other structure of the present invention includes a base plate, threaded stud, lag bolts, spacer, and flashing. The base plate includes bolt holes to accommodate the lag bolts to secure the base plate to the roof. The threaded stud is secured to and extends vertically from the base plate. The spacer is inserted over the stud so that the stud passes through an aperture in the spacer, and is secured by a nut. The spacer acts as a lift for mounting an article up off the roof, thereby permitting drainage below the article and preserving the roof. The spacer preferably includes a recess to accommodate the head of a lag bolt beneath it when installed. The wrap-around flashing component is captured between the base plate and spacer, creating a water free environment underneath the assembled unit. The flashing slides up underneath the roofing shingles (if any) to prevent water from penetrating the structure, and includes a lip to accommodate the base plate, and a detent to accommodate the bolt heads beneath it.

The inventive apparatus thus provides a roof and/or structure mounting system that is self-contained and incorporates positive waterproofing features designed to weather the most difficult environments. The inventive apparatus may be used to mount solar photovoltaic panels, solar water panels, AC units, TV antennas, satellites, guide wire supports, or other articles to roofs and/or other structures.

The apparatus also thus provides a waterproof method of mounting objects to roofs and/or structures with a low profile aspect, minimum installation space, and minimal labor and materials. In addition, the pre-fabricated wrap-around flashing component of the apparatus integrates the mounting system along with waterproofing. Positive waterproofing is accomplished by mechanical attachment only, requiring no exterior sealants, and provides a lifetime UV resistant surface.

It is therefore an object of the present invention to provide a new and improved mounting apparatus.

It is another object of the present invention to provide a new and improved apparatus to mount solar panels to a roof or other structure.

A further object or feature of the present invention is a new and improved waterproof mounting apparatus for solar panels and other articles.

An even further object of the present invention is to provide a novel roof mount that spaces the article from the roof.

Other novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration and description only and are not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
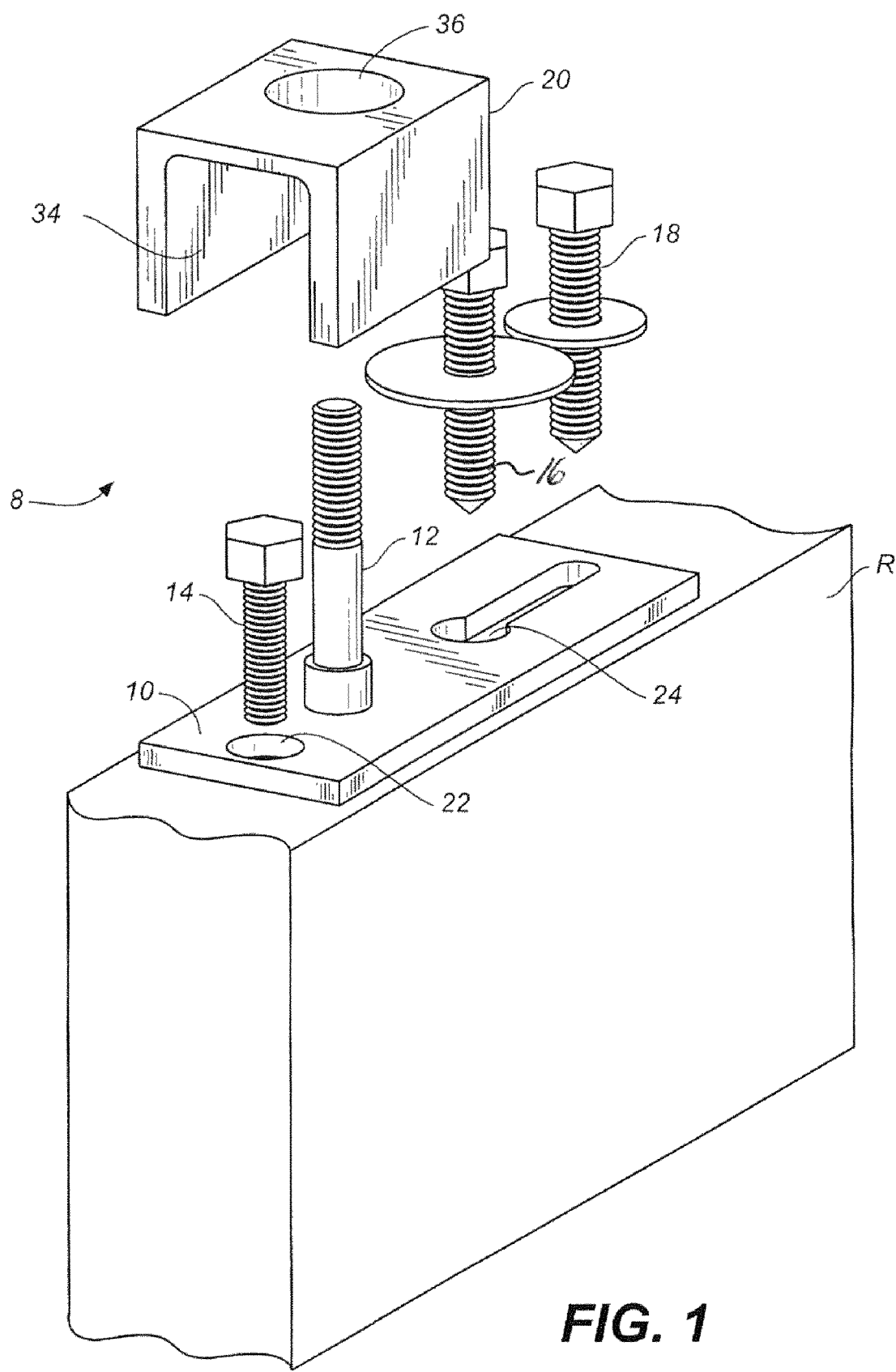
FIG. 1 is a perspective view of the base plate, threaded stud, lag bolt, and spacer components of an apparatus for mounting a solar panel or other article to a roof or other structure of this invention.
Figure 2:
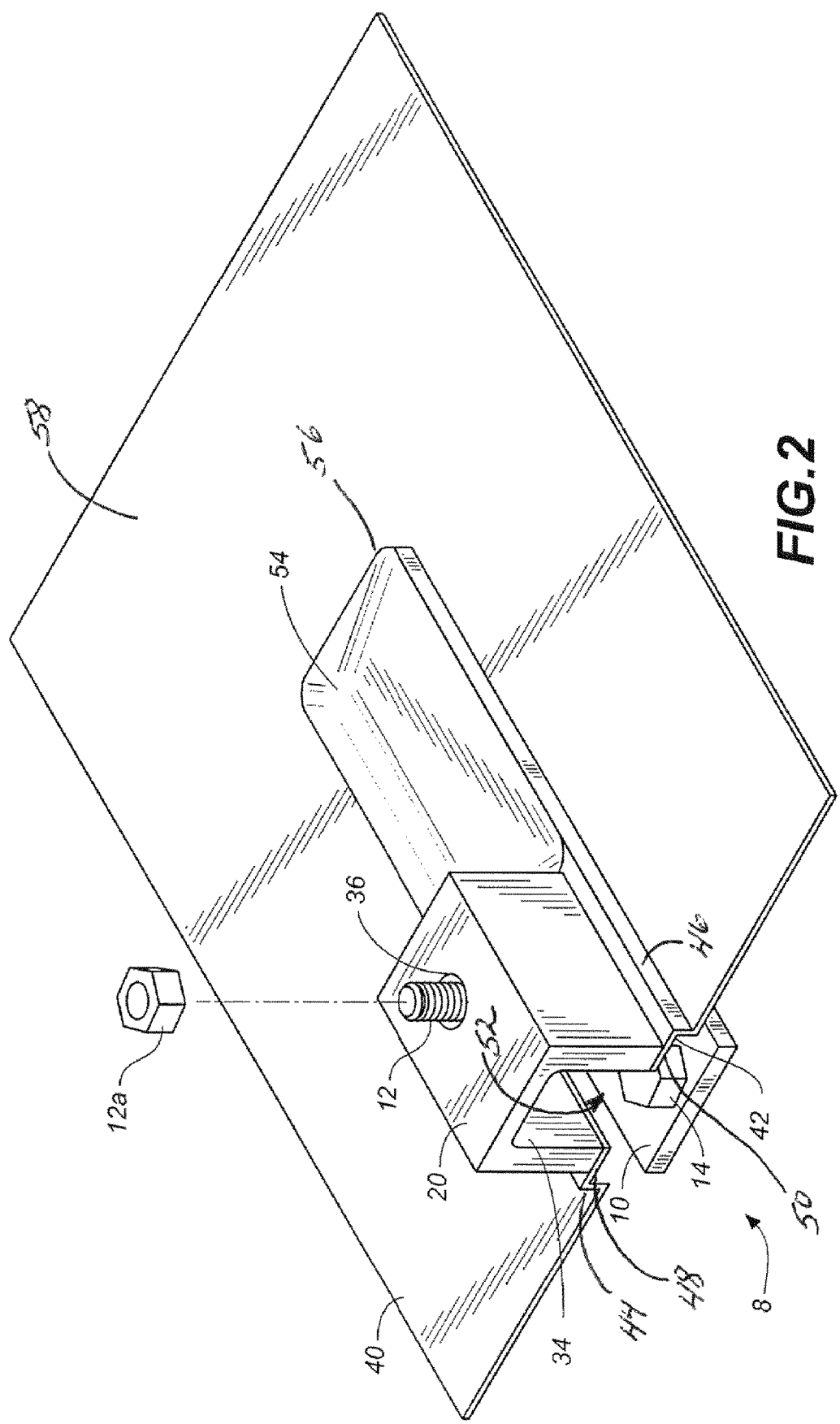
FIG. 2 is a perspective view of the wrap-around flashing component of the apparatus being captured between the base plate and spacer, with the threaded stud extending through the aperture of the spacer for securing by a nut.

Referring to FIGS. 1 and 2, wherein like reference numerals refer to like components in the respective views, there is illustrated therein a new and improved apparatus for mounting a solar panel or other article to a roof or other structure, generally denominated 8 herein.

FIG. 1 is a perspective view of the essential structural elements of the inventive apparatus, including an elongate base plate 10, a threaded stud 12 integral with or welded to the base plate and extending upwardly therefrom, lag bolts 14, 16, 18 and spacer 20. These elements are shown adjacent a roof truss or other structure 22. Base plate 10 is preferably constructed of stainless steel or similar material and is generally elongate, measuring in the preferred embodiment 1.63 inches wide×5.1 inches long. Base plate 10 includes bolt holes 22, 24 to accommodate lag bolts 14, 16, 18. Bolt hole 24 is preferably keyhole-shaped to enable adjustment of the base plate during installation. The base plate further includes an upper end 26 and a lower end 28 oriented according to the installation scheme discussed below, as well as first and second elongate sides 30, 32. Stud 12 is preferably a ⅜" stud also made of stainless steel or similar material, and is preferably fitted and welded into base plate 10.

Spacer 20 is preferably constructed of aluminum or a similar sturdy material, and may measure 1.63 inches wide×2.18 inches long×1.40 inches high. It is generally cuboid in shape and includes a recess 34 that cooperates with the flashing employed in the present invention so as to allow access to the lowermost lag bolt 14 securing the base plate to the roof.

Spacer 20 is inserted over stud 12 such that a substantial length of the stud passes through and extends above an aperture 36 in the top 38 of spacer 20. The spacer 20 is secured by threadably tightening a nut 12a onto stud 12. The spacer 20 acts as a raised mounting platform for mounting an article a suitable distance above the plane of the roof, thereby permitting drainage below the article, allowing free air passage for drying the roof, and thereby protecting and preserving the roof.

Lag bolts 14, 16, 18 secure the base plate to the roof or structure. The apparatus preferably utilizes at least two lag bolts per base plate, which are pre-loaded during installation to ensure that the base plate is tightly secured to the roof or other structure.

FIG. 2 is a perspective view of a wrap-around flashing 40 employed in the present invention. The flashing includes an elevated portion that includes or raised lip 42 with opposing side walls 44, 46 spaced apart so as to provide a small clearance alongside the elongate sides 30, 32 of base plate 10. The side walls of the raised lip 42 each terminate in an upper shelf portion 48, 50 that form a platform for mounting spacer 20. However, the shelves do not converge to form a contiguous shelf; rather, they include a slot 52 which cooperates with an upper detent portion 54 of the elevated portion that cooperates with and complements the slot 52 in allowing the flashing to be placed around (wrapped around) the threaded stud 12 extending above base plate 10 and over the upper portion of the base plate. Thus, during installation the installer slides the flashing down onto and over the base plate, such that the upper end 56 of the detent is generally proximate the upper end 26 of base plate 10. Spacer 20 is placed atop the upper shelves 48, 50 and nut 12a is then tightened down. In this manner spacer 20 secures the wrap-around flashing 40.

The flashing next includes a planar portion 58 which extends outwardly from the raised portion so as to provide a thin shim that slides up underneath roofing shingles (if any) to prevent water from penetrating the structure. The flashing may be colored, coated, or otherwise modified to match the appearance of the surrounding roof shingles and is preferably fabricated from sheet metal or structurally similar material.

An article such as a solar panel (not shown) may be supported by and secured to the spacer and/or stud by various means well known in the art.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. An apparatus for mounting an article to a building structure, said apparatus comprising:
    an elongate base plate having an upper end, a lower end, and first and second elongate sides;
    a threaded stud affixed to said base plate and extending upwardly therefrom;
    lag bolts, including at least a lowermost and uppermost lag bolt for securing said base plate to a roof rafter on a structure;
    a flashing placed over said base plate, said flashing having an elevated portion including an upper detent portion, a raised lip with opposing side walls spaced apart so as to provide a small clearance alongside said elongate sides of said base plate, and a planar portion extending outwardly from said elevated portion so as to provide a thin shim for sliding said flashing underneath a roofing shingles to prevent water from penetrating the building structure, and wherein said side walls of said raised lip terminate in an upper shelf portion and define a slot which cooperates with said upper detent portion of said elevated portion to facilitate placement of said flashing over said base plate and around said threaded stud; and
    a spacer having an aperture for passage of said threaded stud, said spacer mounted on said upper shelf portions of said flashing and secured with a nut.

2. The apparatus of claim 1, wherein said base plate includes at least two bolt holes to accommodate said lag bolts.

3. The apparatus of claim 1, wherein at least one of said bolt holes is keyhole-shaped so as to enable adjustment of the base plate during installation.

4. The apparatus of claim 1, wherein said spacer is generally cuboid in shape and includes a recess that cooperates with said flashing to allow access to a lowermost lag bolt which secures said base plate to the building structure.

5. The apparatus of claim 1, wherein when assembled said upper end of said detent is generally proximate said upper end of said base plate.

* * * * *